US009998962B2

(12) United States Patent
Tian (10) Patent No.: US 9,998,962 B2
(45) Date of Patent: Jun. 12, 2018

(54) METHOD FOR PROCESSING RADIO ACCESS, FORWARDING DEVICE, AND NETWORK CONTROLLER (71) Applicant: ZTE CORPORATION, Shenzhen (CN)

(72) Inventor: Tian Tian, Shenzhen (CN)

(73) Assignee: ZTE Corporation (CN)

(*) Notice: Subject to any disclaimer, the term of this patent is extended or adjusted under 35 U.S.C. 154(b) by 169 days.

(21) Appl. No.: 14/914,776

(22) PCT Filed: May 22, 2014

(86) PCT No.: PCT/CN2014/078192
§ 371 (c)(1),
(2) Date: Feb. 26, 2016

(87) PCT Pub. No.: WO2015/085715
PCT Pub. Date: Jun. 18, 2015

(65) Prior Publication Data
US 2016/0205598 A1 Jul. 14, 2016

(30) Foreign Application Priority Data
Dec. 10, 2013 (CN) .......................... 2013 1 0671781

(51) Int. Cl.
H04W 4/00 (2018.01)
H04W 36/00 (2009.01)
(Continued)

(52) U.S. Cl.
CPC ....... H04W 36/0083 (2013.01); H04W 48/08 (2013.01); H04W 84/12 (2013.01)

(58) Field of Classification Search
CPC ..... H04W 84/02; H04W 88/12; H04W 88/08; H04W 36/0083; H04W 84/12
(Continued)

(56) References Cited

U.S. PATENT DOCUMENTS 9,215,642 B2* 12/2015 Xu ........................ H04L 61/103
2008/0181161 A1 7/2008 Gi Kim et al.
(Continued)

FOREIGN PATENT DOCUMENTS

CN 102316488 A 1/2012
CN 103118366 A 5/2013
(Continued)

OTHER PUBLICATIONS

PCT International Search Report dated Sep. 22, 2014, Application No. PCT/CN2014/078192, 3 Pages.
(Continued)

Primary Examiner — Chi H Pham
Assistant Examiner — Alexander O Boakye
(74) Attorney, Agent, or Firm — Plumsea Law Group, LLC (57) ABSTRACT Disclosed are a method for processing wireless access, a forwarding device and a network controller. The method includes: the forwarding device establishing a wireless access point table for local access; the forwarding device maintaining the wireless access point table for local access according to whether a wireless access point in the wireless access point table for local access exists and a state of the wireless access point in the wireless access point table for local access. The embodiments of the present document have achieved that the data of a corresponding relationship between APs and home forwarding devices are kept consistently under a pure WLAN network scenario or a multi-network integrated scenario in which the WLAN network accesses a mobile core network.

16 Claims, 7 Drawing Sheets (51) Int. Cl.
 *H04W 48/08* (2009.01)
 *H04W 84/12* (2009.01)
(58) Field of Classification Search
 USPC .......................................................... 370/331
 See application file for complete search history.

(56) References Cited

U.S. PATENT DOCUMENTS

2008/0299966 A1* 12/2008 Masuda ................. H04L 63/08
                                                                455/432.1
2010/0182984 A1   7/2010 Herscovici et al.
2012/0176936 A1*  7/2012 Wu ......................... H04W 8/26
                                                                370/254

FOREIGN PATENT DOCUMENTS

| CN | 103686854 A  | 3/2014  |
| EP | 2252112 A1   | 11/2010 |
| WO | 2008031361 A1| 3/2008  |

OTHER PUBLICATIONS

Extended European Search Report dated Sep. 7, 2016, Application No. 14869306.2-1854 / 3029983, Applicant ZTE Corporation, 10 Pages.

\* cited by examiner

METHOD FOR PROCESSING RADIO ACCESS, FORWARDING DEVICE, AND NETWORK CONTROLLER

CROSS-REFERENCE TO RELATED APPLICATIONS

This application is a U.S. national phase of PCT Application No. PCT/CN2014/078192 filed May 22, 2014, which claims priority to Chinese Application No. 201310671781.2, filed Dec. 10, 2013, the disclosures of which are incorporated in their entirety by reference herein.

TECHNICAL FIELD

The present document relates to the technology of processing wireless access, and more particularly, to a method for processing wireless access, a forwarding device, and a network controller, under the network architecture of separation of control and forwarding, after a terminal of wireless local area networks (WLAN) hands over to a new wireless access point (AP).

BACKGROUND OF THE RELATED ART

At present, the WLAN network adopts a star architecture with base station+ base station controller, that is a wireless access controller (AP+AC). When the terminal hands over between the APs, the AC is responsible for maintaining identity information of the terminal and performing handover on the data channel of the terminal. And the AC or border router/broadband remote access server (BRAS) is responsible for data forwarding.

With the deployment of 802.11ac products, the air interface rate will go into the 1 Gbps era, if it continues to use the start architecture with AP+AC, one AC is generally responsible for managing dozens of to thousands of APs, the AC is under the pressure of huge data forwarding, so that the requirements for the routing performance and forwarding performance of AC are high, which will become a data bottleneck. Since the border router/BRAS work on the layer 3, and undertake a lot of works such as user attribute management, so that the forwarding efficiency is low, and the cost is high. At the same time, switches and routers with high performances are required by the bearer network to transmit data. Thus, the service network and bearer network form two superimposed networks, such superimposed architecture not only increases the forwarding delay, management complexity and failure probability, but also improves the costs of the network construction and maintenance.

SUMMARY

The technical problem to be solved by the embodiments of the present document is to provide a method for processing wireless access, a forwarding device and a network controller, which can achieve that data of a corresponding relationship between APs and home forwarding devices are kept consistently under a pure WLAN scenario, or a multi-network integrated scenario of the WLAN network accessing the mobile core network.

In order to solve the above-mentioned technical problem, the following technical scheme is adopted:

The embodiment of the present document provides a method for processing wireless access, comprising:

a forwarding device establishing a wireless access point table for local access; and the forwarding device maintaining the wireless access point table for local access according to whether a wireless access point in the wireless access point table for local access exists and a state of the wireless access point in the wireless access point table for local access.

Alternatively, the above-mentioned method is further characterized in that: the step of the forwarding device maintaining the wireless access point table for local access according to whether a wireless access point in the wireless access point table for local access exists and a state of the wireless access point in the wireless access point table for local access comprises:

after the forwarding device has received data, if it is determined that a media access control address of a wireless access point sending the data is in a pre-stored manufacturer wireless access point media access control address field table, and not in a non-access list, the forwarding device updating the wireless access point table for local access, and sending an updating request to a network controller.

Alternatively, the above-mentioned method is further characterized in that: the step of updating the wireless access point table for local access comprises:

the forwarding device judging whether the media access control address of the wireless access point sending the data has existed in the wireless access point table for local access, if the media access control address of the wireless access point sending the data has not existed in the wireless access point table for local access, adding an entry corresponding to the wireless access point sending the data into the wireless access point table for local access; if the media access control address of the wireless access point sending the data has existed in the wireless access point table for local access, updating time information corresponding to the wireless access point sending the data in the wireless access point table for local access.

Alternatively, the above-mentioned method is further characterized in that: the step of the forwarding device maintaining the wireless access point table for local access according to whether a wireless access point in the wireless access point table for local access exists and a state of the wireless access point in the wireless access point table for local access comprises:

the forwarding device detecting, one by one, whether a wireless access point in the wireless access point table for local access has transmitted or received data in a specified time period; and the forwarding device deleting an entry corresponding to the wireless access point which has not transmitted or received data in the specified time period from the wireless access point table for local access, and sending a deleting request to the network controller.

Alternatively, the above-mentioned method is further characterized in that: the step of the forwarding device maintaining the wireless access point table for local access according to whether a wireless access point in the wireless access point table for local access exists and a state of the wireless access point in the wireless access point table for local access comprises:

the forwarding device detecting, one by one, whether a wireless access point in the wireless access point table for local access has transmitted or received data in a preset time period corresponding to the wireless access point; and the forwarding device deleting an entry corresponding to a wireless access point which has not transmitted or received data in the preset time period corresponding to the wireless access points from the wireless access point table for local access, and sending a deleting request to the network controller.

Alternatively, the above-mentioned method is further characterized in that: the step of the forwarding device maintaining the wireless access point table for local access according to whether a wireless access point in the wireless access point table for local access exists and a state of the wireless access point in the wireless access point table for local access comprises:

after receiving a deleting message, the forwarding device deleting an entry corresponding to a wireless access point specified by the deleting message from the wireless access point table for local access, or moving the entry corresponding to the wireless access point specified by the deleting message into a non-access list from the wireless access point table for local access, and adding an inhibit time of the wireless access point specified by the deleting message into the non-access list.

The embodiment of the present document further provides a forwarding device, comprising: an establishing module and a maintenance module, wherein:

the establishing module is configured to: establish a wireless access point table for local access; and the maintenance module is configured to: maintain the wireless access point table for local access according to whether a wireless access point in the wireless access point table for local access exists and a state of the wireless access point in the wireless access point table for local access.

Alternatively, the above forwarding device is further characterized in that:

the maintenance module is configured to maintain the wireless access point table for local access according to whether a wireless access point in the wireless access point table for local access exists and a state of the wireless access point in the wireless access point table for local access by the following way:

after the maintenance module has received data, if it is determined that a media access control address of a wireless access point sending the data is in a pre-stored manufacturer wireless access point media access control address field table, and not in a non-access list, the maintenance module updating the wireless access point table for local access, and sending an updating request to a network controller.

Alternatively, the above forwarding device is further characterized in that:

the maintenance module is configured to update the wireless access point table for local access by the following way: the maintenance module judging whether the media access control address of the wireless access point sending the data has existed in the wireless access point table for local access, if the media access control address of the wireless access point sending the data has not existed in the wireless access point table for local access, adding an entry corresponding to the wireless access point sending the data into the wireless access point table for local access; if the media access control address of the wireless access point sending the data has existed in the wireless access point list for local access, updating time information corresponding to the wireless access point sending the data in the wireless access point table for local access.

Alternatively, the above forwarding device is further characterized in that:

the maintenance module is configured to maintain the wireless access point table for local access according to whether a wireless access point in the wireless access point table for local access exists and a state of the wireless access point in the wireless access point table for local access by the following way: the maintenance module detecting, one by one, whether a wireless access point in the wireless access point table for local access has transmitted or received data in a specified time period; and the maintenance module deleting an entry corresponding to the wireless access point which has not transmitted or received data in the specified time period from the wireless access point table for local access, and sending a deleting request to the network controller.

Alternatively, the above forwarding device is further characterized in that:

the maintenance module is configured to maintain the wireless access point table for local access according to whether a wireless access point in the wireless access point table for local access exists and a state of the wireless access point in the wireless access point table for local access by the following way: the maintenance module detecting, one by one, whether a wireless access point in the wireless access point table for local access has transmitted or received data in a preset time period corresponding to the wireless access point; and the maintenance module deleting an entry corresponding to a wireless access point which has not transmitted or received data in the pre-set time period corresponding to the wireless access point from the wireless access point table for local access, and sending a deleting request to the network controller.

Alternatively, the above forwarding device is further characterized in that:

the maintenance module is configured to maintain the wireless access point table for local access according to whether a wireless access point in the wireless access point table for local access exists and a state of the wireless access point in the wireless access point table for local access by the following way: after receiving a deleting message, the maintenance module deleting an entry corresponding to a wireless access point specified by the deleting message from the wireless access point table for local access, or moving the entry corresponding to the wireless access point specified by the deleting message into a non-access list from the wireless access point table for local access, and adding an inhibit time of the wireless access point specified by the deleting message into the non-access list.

Alternatively, the embodiment of the present document provides a method for processing wireless access, comprising:

a network controller establishing a corresponding relationship table between entire network wireless access points and home forwarding devices; and the network controller maintaining the corresponding relationship table between entire network wireless access points and home forwarding devices according to a received processing request or a policy instruction.

Alternatively, the method is further characterized in that: the step of the network controller maintaining the corresponding relationship table between entire network wireless access points and home forwarding devices according to a received processing request comprises:

after receiving an updating request message, the network controller checking whether a corresponding entry of a wireless access point specified by the updating request message has existed in the corresponding relationship table between entire network wireless access points and home forwarding devices, if the corresponding entry of the wireless access point specified by the updating request message has existed in the corresponding relationship table between entire network wireless access points and home forwarding devices, updating parameters in the corresponding entry according to parameters carried in the updating request message; if the corresponding entry of the wireless access point specified by the updating request message has not existed in the corresponding relationship table between entire network wireless access points and home forwarding devices, adding a corresponding entry of the wireless access point specified by the updating request message into the corresponding relationship table between entire network wireless access points and home forwarding devices.

Alternatively, the method is further characterized in that: the step of the network controller maintaining the corresponding relationship table between entire network wireless access points and home forwarding devices according to a received processing request comprises:

after receiving a deleting message, the network controller deleting a corresponding entry of a wireless point specified by the deleting message from the corresponding relationship table between entire network wireless access points and home forwarding devices.

Alternatively, the method is further characterized in that: the step of the network controller maintaining the corresponding relationship table between entire network wireless access points and home forwarding devices according to a policy instruction comprises:

the network controller deleting a corresponding entry of a specified wireless access point from the corresponding relationship table between entire network wireless access points and home forwarding devices, and sending a deleting message to a forwarding device related to the specified wireless access point.

The embodiment of the present document further provides a network controller, comprising: an establishing module and a maintenance module, wherein:

the establishing module is configured to establish a corresponding relationship table between entire network wireless access points and home forwarding devices; and the maintenance module is configured to maintain the corresponding relationship table between entire network wireless access points and home forwarding devices according to a received processing request or a policy instruction.

Alternatively, the above network controller is further characterized in that:

the maintenance module is configured to maintain the corresponding relationship table between entire network wireless access points and home forwarding devices according to a received processing request or a policy instruction by the following way: after receiving an updating request message, the maintenance module checking whether a corresponding entry of a wireless access point specified by the updating request message has existed in the corresponding relationship table between entire network wireless access points and home forwarding devices, if the corresponding entry of the wireless access point specified by the updating request message has existed in the corresponding relationship table between entire network wireless access points and home forwarding devices, updating parameters in the corresponding entry according to parameters carried in the updating request message; if the corresponding entry of the wireless access point specified by the updating request message has not existed in the corresponding relationship table between entire network wireless access points and home forwarding devices, adding a corresponding entry of the wireless access point specified by the updating request message into the corresponding relationship table between entire network wireless access points and home forwarding devices.

Alternatively, the above network controller is further characterized in that:

the maintenance module is configured to maintain the corresponding relationship table between entire network wireless access points and home forwarding devices according to a received processing request or a policy instruction by the following way: after receiving a deleting message, the maintenance module deleting a corresponding entry of a wireless point specified by the deleting message from the corresponding relationship table between entire network wireless access points and home forwarding devices.

Alternatively, the above network controller is further characterized in that:

the maintenance module is configured to maintain the corresponding relationship table between entire network wireless access points and home forwarding devices according to a received processing request or a policy instruction by the following way: the maintenance module deleting a corresponding entry of a specified wireless point from the corresponding relationship table between entire network wireless access points and home forwarding devices, and sending a deleting message to a forwarding device related to the specified wireless access point.

The method for processing wireless access, the forwarding device and the network controller provided by the embodiments of the present document have achieved that data of a corresponding relationship between APs and home forwarding devices are kept consistently under a pure WLAN network scenario or a multi-network integrated scenario in which the WLAN network accesses a mobile core network.

PREFERRED EMBODIMENTS

The embodiments of the present document will be illustrated in detail hereinafter in conjunction with accompanying drawings. It should be noted that, in the case of no conflict, the embodiments in the present application and features in the embodiments can be combined arbitrarily with each other.

Figure 1:
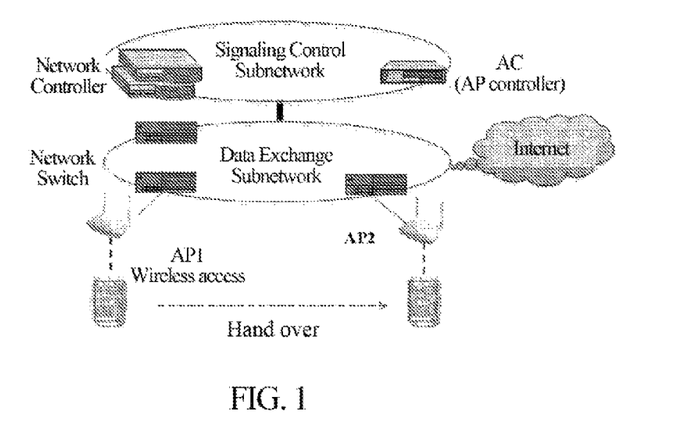
FIG. 1 is a schematic diagram of a system architecture in accordance with an embodiment of the present document.

As shown in FIG. 1, the system architecture of the embodiment of the present document is composed of two kinds of subnetworks: a signaling control subnetwork is composed of one or more network controllers and a data exchange subnetwork is composed of multiple network forwarding devices that connect with each other in the form of reticulation, and the forwarding devices refer to various exchange devices supporting SDN, including two layer switch and three layer switch supporting the SDN and the gateway, etc. The signaling control subnetwork instantly calculates user's data trend exchange policy and flow table, and sends the exchange policy and flow table to the data exchange subnetwork, the later forwards the user data according to the exchange policy and flow table.

The AC is taken as a logic network element, can be deployed independently, and also can be integrated in the control subnetwork to achieve. The main functions of the AC are: user identity authentication and service control, AP software and hardware management, AP work state management, etc.

The data stream of the terminal is transmitted by the data exchanged subnetwork, and does not pass through the AC.

The AP is directly connected to the forwarding device of the data exchange subnetwork or connected to the forwarding device of the data forwarding subnetwork through an ordinary switch (a two-layer switch which does not support the separation of controlling and the forwarding), and the later is referred to a home forwarding device of that AP.

The embodiment of the present document achieves that, based on the IP network architecture of separation of controlling and forwarding, under a pure WLAN network scenario or a multi-network integrated scenario in which the WLAN network accesses a mobile core network, when the user service policy is adjusted dynamically whatever IP mobility requirement is required or according to the network performance (e.g., load balance, network congestion control) and/or user attribute (users with a high or low priority), the corresponding relationship of the AP and forwarding device is required to know, that is, the signaling controller and data forwarding device are required to respectively keep and maintain the "entire network AP-home forwarding device corresponding table" and "AP table for local access" in real-time. A table maintenance mechanism is that, the AP is over aging time is deleted, and the AP which has sent the data is added. If it is to establish and maintain the above corresponding table manually, and the workload is great and the data cannot be kept coincident.

Figure 2:
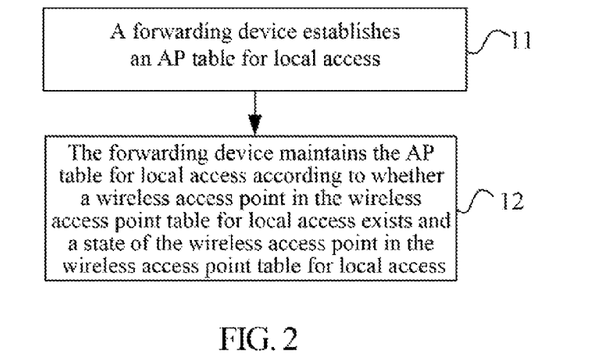
FIG. 2 a flow chart of a method of a forwarding device processing wireless access in accordance with an embodiment of the present document.

FIG. 2 is a flow chart of a forwarding device processing wireless access in accordance with an embodiment of the present document, as shown in FIG. 2, and as shown in FIG. 2, the method of the present embodiment comprises:

in step 11, the forwarding device establishes an AP table for local access; and in step 12, the forwarding device maintains the wireless access point table for local access according to whether a wireless access point in the wireless access point table for local access exists and a state of the wireless access point in the wireless access point table for local access.

Figure 3:
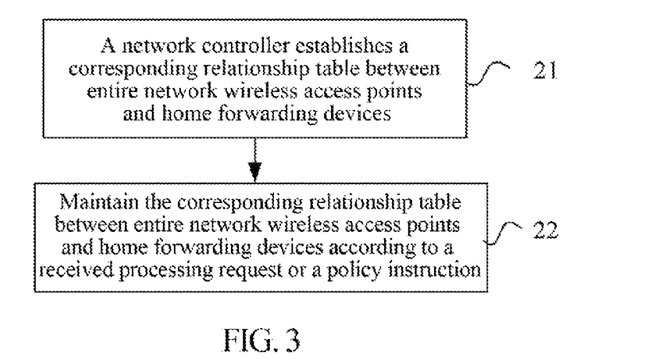
FIG. 3 is a flow chart of a method of a network controller processing wireless access in accordance with an embodiment of the present document.

FIG. 3 is a flow chart of a method of a network controller processing wireless access in accordance with an embodiment of the present document, and as shown in FIG. 3, the method of the present embodiment comprises:

in step 21, a network controller establishes a corresponding relationship table between entire network wireless access points and home forwarding devices; and in step 22, the network controller maintains the corresponding relationship table between entire network wireless access points and home forwarding devices according to a received processing request or a policy instruction.

The embodiment of the present document provides the method for processing wireless access, and in the method that the IP network that separates the controlling and forwarding can automatically establish and maintain the "AP table for local access" and the "entire AP-home forwarding device corresponding table", when the terminal moves between different APs, the methods can make the signaling control sub-network query information of home devices of the APs before and after the movement of the terminal, thereby a forwarding policy of the forwarding device can be updated fast, which can make the forwarding device cache and/or forwarding uplink/downlink data (data that are sent by the terminal to the network side are referred to as uplink data, conversely, downlink data) thereby keeping continuity of the service.

In the embodiment, the forwarding device maintains the "AP table for local access", and the network controller maintains the "entire network AP-home forwarding device corresponding table". An entry in the "entire network AP-home forwarding device corresponding table" at least comprises fields: AP media access control (MAC), a forwarding device network identification, and latest accessing time.

The APs of global manufacturers have their own dedicated MAC address field, a "manufacturer AP MAC address field table" is stored in the network controller and data forwarding device by means of pre-configuration and dynamic sending, for example, the manufacturer AP MAC address field table is downloaded on the network controller through a network management system, then the network controller sends the manufacturer AP MAC address field table to the forwarding device managed by the network controller.

The data forwarding device matches corresponding MAC according to the manufacturer AP MAC address field table stored by itself, and establishes and maintains the "AP table for local access", which comprises: adding an entry of an AP that sends new data, updating an entry of an AP that does not send new data, deleting an entry of an AP that does not receive and send data within a time of a fixed-length or deleting an entry of an AP that be compulsively deleted, and sending corresponding report information to the network controller.

The network controller maintains the "entire network AP-home forwarding device corresponding table" according to the report information of the data forwarding device, which comprises: adding, updating and deleting an entry of an AP; and network controller can determine to delete an entry of a certain AP according to the policy, and inform the data forwarding device to delete the corresponding entry.

The forwarding device establishes and maintains the AP table for local access through the above table and the following method:

When data sent by a certain MAC address are received, if the MAC address is not in the non-access list, but belongs to the "manufacturer AP MAC address field table" stored in the data forwarding device, then the data forwarding device adds the MAC address into the "AP table for local access", and sends an adding request to the network controller, and the request includes: an adding identification, an AP network identification, and a forwarding device network identification; if the MAC address is already in the "AP table for local access", the data forwarding device updates the active time in the entry of the AP MAC;

if AP MAC has not transmitted and received data for a long time (a length of the time can be strategically configured by the operator according to the situation of the actual usage), the data forwarding device deletes the AP from the "AP table for local access", and sends a deleting request to the network controller;

if a compulsion AP deleting instruction sent by the network controller is received, and the instruction includes the AP MAC to be deleted, the forwarding device looks up the "AP table for local access" to delete, if the instruction includes an inhibit time, it is to add the MAC into the non-access list, and reject the AP to access within the corresponding time period.

The network controller maintains and manages the "entire network AP-home forwarding device corresponding table" according to the data forwarding device managed by the network controller:

if an adding request sent by the forwarding device is received, the network controller adds it into the "entire network AP-home forwarding device corresponding table";

if an aging request sent by the forwarding device is received, the network controller deletes entries of the AP and home forwarding device corresponding to the network controller from the "entire network AP-home forwarding device corresponding table";

if it is required to delete a certain AP compulsively, the compulsion AP deleting instruction is sent to the forwarding device, the instruction includes an AP MAC, an inhibit time, etc.

The related table structures and various fields of the present embodiment are as follows:

---

"a manufacturer AP MAC address field table" (which is included in both the forwarding device and the controller):
AP MAC address field1, manufacturer name
AP MAC address field2, manufacturer name
... ...
"a current MAC address table" (which is maintained in the forwarding device):
MAC address1, latest active time
MAC address2, latest active time
... ...
"an AP table for local access" (which is maintained in the forwarding device):
AP MAC address1, latest active time
AP MAC address2, latest active time
... ...
"an entire network AP-home forwarding device corresponding table" (which is maintained in the controller):
forwarding device network identification1, AP MAC address 1( latest active time)
forwarding device network identification1, AP MAC address 2( latest active time)

-continued forwarding device network identification2, AP MAC address 3( latest active time)
... ...

---

Wherein, the "manufacturer AP MAC address field table" is stored in the network controller and data forwarding device by means of pre-configuration and dynamic sending, for example, the manufacturer AP MAC address field table is downloaded on the network controller by means of pre-configuration, or the manufacturer AP MAC address field table is downloaded on the network controller through a network management system, then the network controller sends the manufacturer AP MAC address field table to the forwarding device managed by the network controller. For all the embodiments below, it is default that the network controller and the forwarding device have stored the "manufacturer AP MAC address field table".

Figure 4:
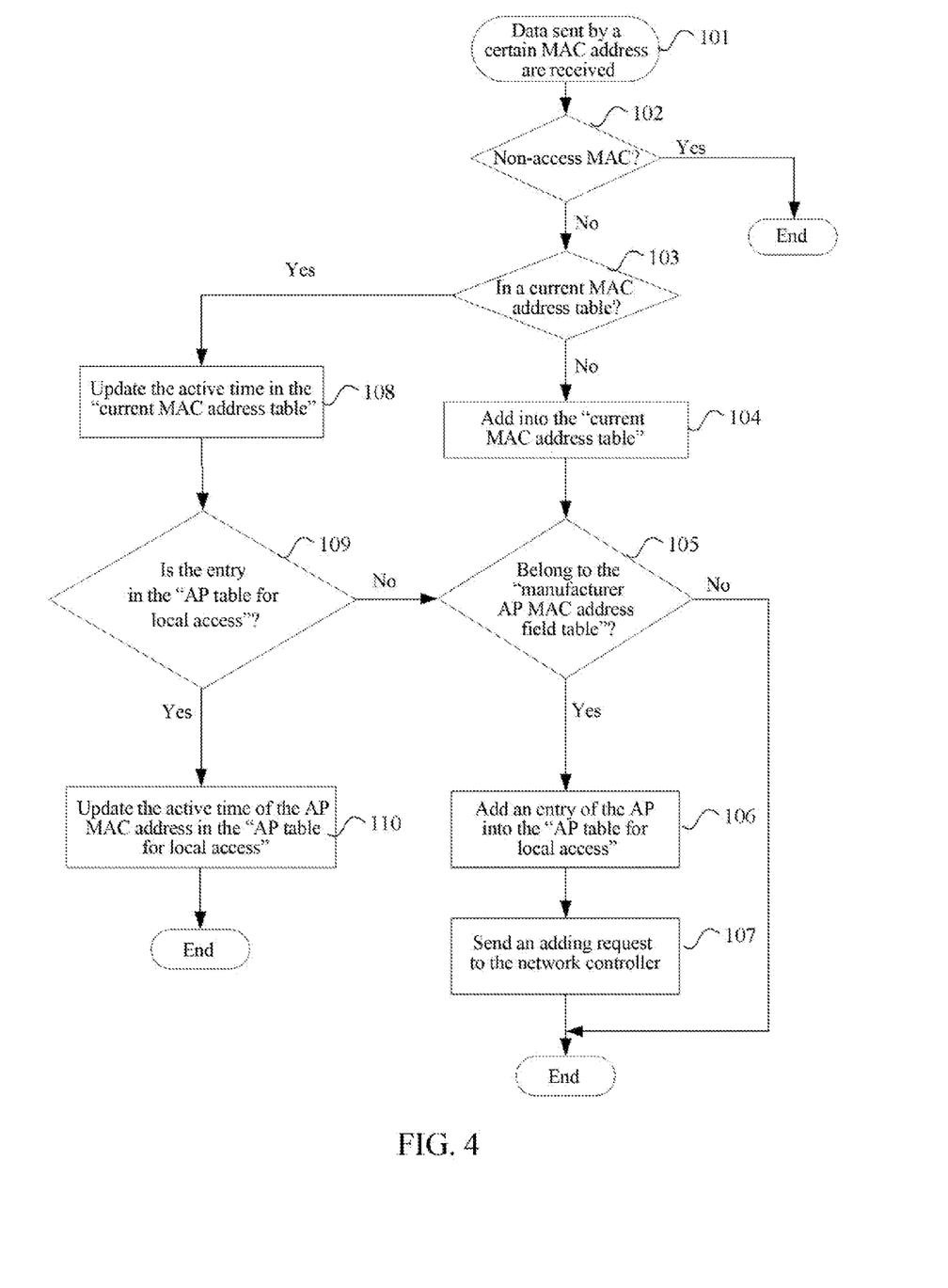
FIG. 4 is a flow chart of the forwarding device adding and updating a "local AP-home forwarding device corresponding table" in accordance with the embodiment 1 of the present document.

FIG. 4 is a flow chart of the forwarding device adding and updating the "AP table for local access" in accordance with the embodiment 1 of the present document, and as shown in FIG. 4, it comprises the following steps:

in step 101, data sent by an MAC address are received.

In step 102, it is to judge whether the MAC address is in a non-access list, if the MAC address is in the non-access list, the MAC device is not allowed to access, the flow ends; otherwise, it is to proceed to step 103.

In step 103, if the MAC address is not in the non-access list, it is to judge whether the MAC address is in a current MAC address table, if the MAC address is not in the current MAC address table, it is to proceed to step 104; if the MAC address is in the current MAC address table, it is to proceed to step 108.

In step 104, it is to add the MAC address into the current MAC address table.

In step 105, it is to compare the MAC address with the "manufacturer AP MAC address field table" in the forwarding device, and judge whether the MAC address belongs to the "manufacturer AP MAC address field table", if the MAC address belongs to the "manufacturer AP MAC address field table", it is to proceed to step 106, if the MAC address does not belong to the "manufacturer AP MAC address field table", the flow ends.

In step 106, it is to add an entry of the MAC in the "AP table for local access", the entry can include fields: AP MAC, forwarding device network identification, and latest adding time.

In step 107, it is to send an AP adding request to the network controller.

In step 108, if the MAC address is in the current MAC address table, it is to update active time of the MAC in the MAC address table.

In step 109, it is to look up whether an entry including the MAC has existed in the "AP table for local access", if the entry including the MAC has existed in the "AP table for local access", it is to proceed step 110; if the entry including the MAC has not existed in the "AP table for local access", it is to proceed to the step 105.

In step 110, it is to update the active time in the entry, the flow ends.

Figure 5:
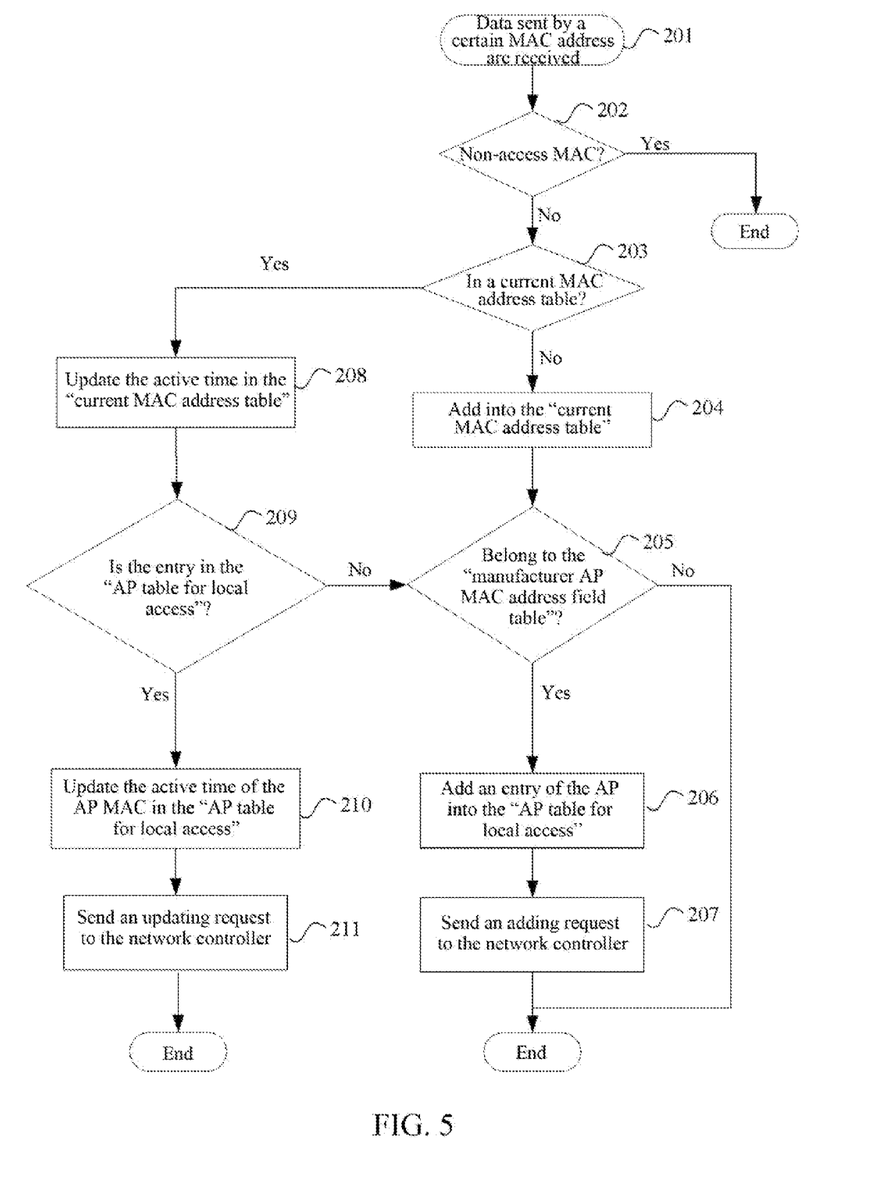
FIG. 5 is a flow chart of the forwarding device adding and updating a "local AP-home forwarding device corresponding table" in accordance with the embodiment 2 of the present document.

FIG. 5 is a flow chart of the forwarding device adding and updating the "AP table for local access" in the embodiment 2, the different with the embodiment 1 is only in the third step, in which after updating the active time of the entry of the corresponding AP in the "AP table for local access", a corresponding updating request is sent to the controller, and as shown in FIG. 5, which includes the following steps:

in step 201, data sent by an MAC address are received.

In step 202, it is to judge whether the MAC address is in a non-access list, if the MAC address is in the non-access list, the MAC device is not allowed to access, the flow ends; otherwise, it is to proceed to step 203.

In step 203, if the MAC address is not in the non-access list, it is to judge whether the MAC address is in a current MAC address table, if the MAC address is not in the current MAC address table, it is to proceed to step 204; if the MAC address is in the current MAC address table, it is to proceed to step 208.

In step 204, it is to add the MAC address into the current MAC address table.

In step 205, it is to compare the MAC address with the "manufacturer AP MAC address field table" in the forwarding device, and judge whether the MAC address belongs to the "manufacturer AP MAC address field table", if the MAC address belongs to the "manufacturer AP MAC address field table", it is to proceed to step 206, if the MAC address does not belong to the "manufacturer AP MAC address field table", the flow ends.

In step 206, it is to add an entry of the MAC in the "AP table for local access", the entry can include fields: AP MAC, a forwarding device network identification, and latest adding time.

In step 207, it is to send an AP adding request to the network controller.

In step 208, if the MAC address is in the current MAC address table, it is to update active time of the MAC in the MAC address table.

In step 209, it is to look up whether an entry including the MAC has existed in the "AP table for local access", if the entry including the MAC has existed in the "AP table for local access", it is to proceed step 210; if the entry including the MAC has not existed in the "AP table for local access", it is to proceed to the step 205.

In step 210, it is to update the active time in the entry.

Figure 6:
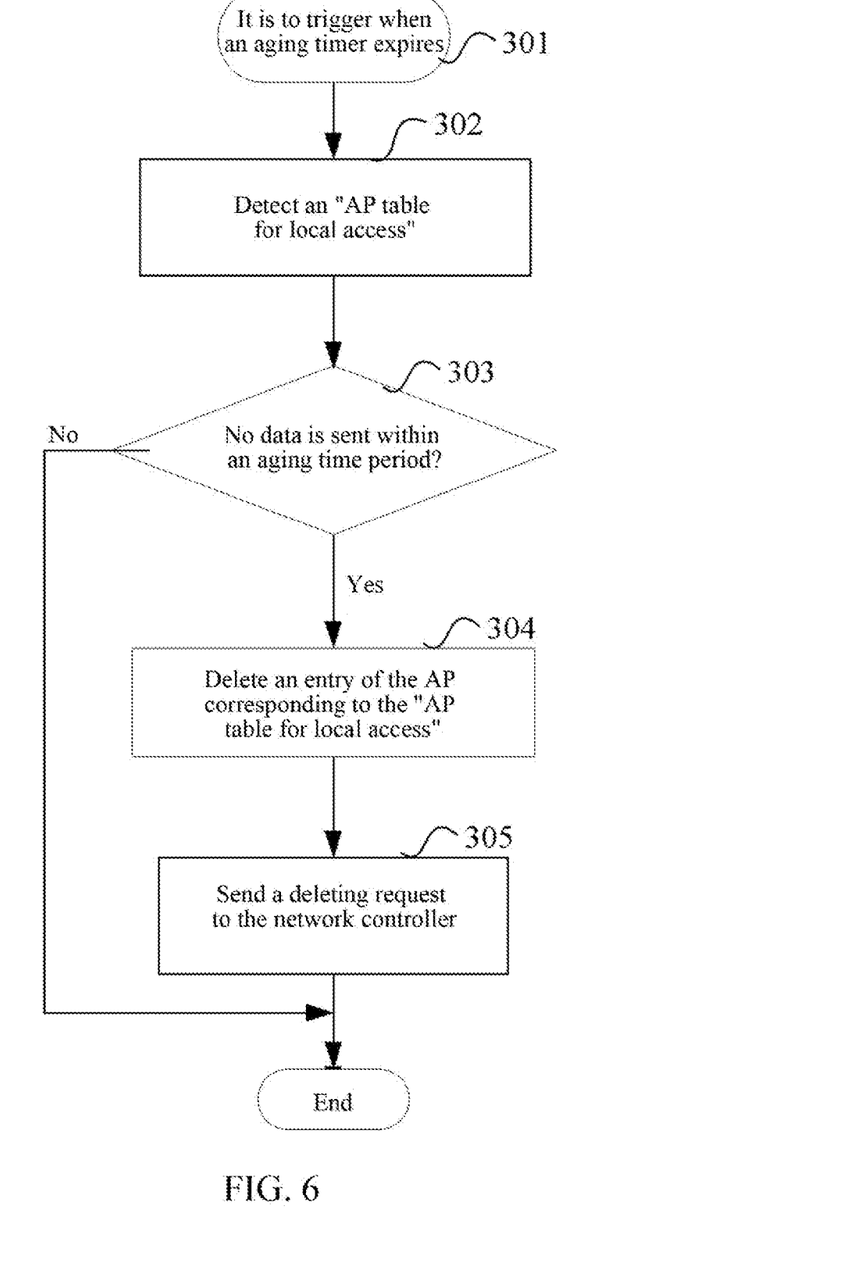
FIG. 6 is a flow chart of the forwarding device deleting an entry of the "local AP-home forwarding device corresponding table" in accordance with the embodiment 3 of the present document.

In step 211, it is to send an updating request to the network controller, the flow ends. FIG. 6 is a flow chart of the forwarding device deleting an entry of the "AP table for local access" in accordance with the embodiment 3 of the present document, in the embodiment, the entry triggered by an aging timer that expires is deleted, and as shown in FIG. 6, the following steps are included:

In step 301, the aging time expires, it triggers the forwarding device to detect an "AP table for local access";

in step 302, the forwarding device checks AP MAC addresses in the table one by one;

in step 303, it is to judge whether each AP MAC address has sent data within an aging time period, if the AP MAC address has sent the data within the aging time period, the flow ends; if the AP MAC address has not sent the data within the aging time period, it is to proceed to step 304;

In step 304, the forwarding device deletes the AP MAC address from the "AP table for local access";

In step 305, the forwarding device sends a deleting request to the controller, the contents include: an aging/deleting identification, AP MAC, a forwarding device network identification, then the flow ends.

Figure 7:
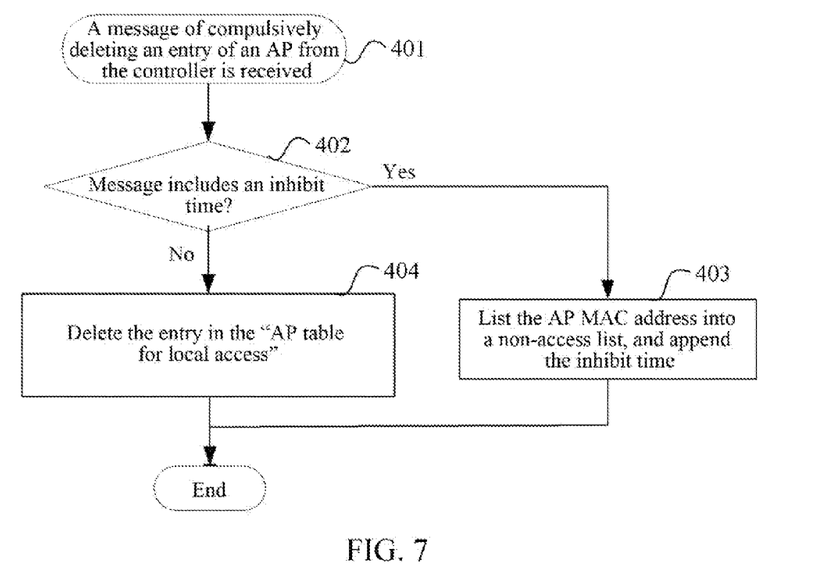
FIG. 7 is a flow chart of the forwarding device deleting an entry of the "local AP-home forwarding device corresponding table" in accordance with the embodiment 4 of the present document.

FIG. 7 is a flow chart of the forwarding device deleting an entry of the "AP table for local access" in accordance with the embodiment 4 of the present document, in the embodiment, the entry triggered by the forwarding device has received the compulsion deleting instruction of the controller is deleted, and as shown in FIG. 7, the following steps are included:

In step 401, the forwarding device has received a compulsion deleting message, wherein, the message includes a deleting identification, the AP MAC;

In step 402, it is to judge whether the deleting message includes the inhibit time, if the deleting message does not include the inhibit time, it is to proceed to step 403; if the deleting message includes the inhibit time, it is to proceed to step 404;

In step 403, the forwarding device deletes an entry corresponding to the AP MAC included in the message from the "AP table for local access";

In step 404, if the message further includes the inhibit time, the forwarding device lists the MAC into a non-access list, and appends the inhibit time, and rejects the AP to access within the corresponding time period.

Figure 8:
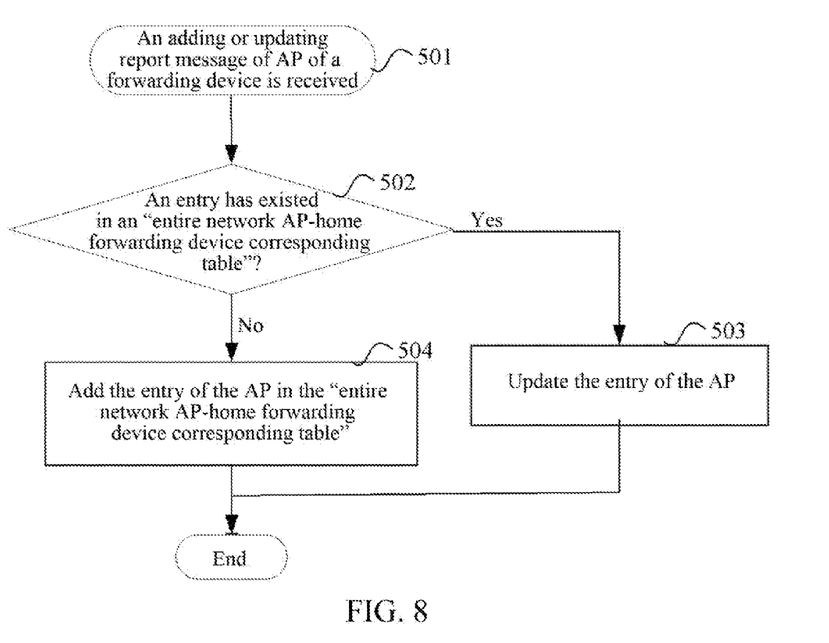
FIG. 8 is a flow chart of the network controller maintaining an "entire network AP-home forwarding device corresponding table" in accordance with the embodiment 5 of the present document.

FIG. 8 is a flow chart of the network controller maintaining the "entire network AP-home forwarding device corresponding table" in accordance with the embodiment 5 of the present document, and as shown in FIG. 8, the following steps are included:

in step 501, the network controller has received an adding or updating request message sent by the forwarding device;

in step 502, the network controller checks whether a corresponding entry of the AP MAC in the message has been included in the "entire network AP-home forwarding device corresponding table", if the entry of the AP MAC has been included in the "entire network AP-home forwarding device corresponding table", it is to proceed to step 503; if it has not checked out the corresponding entry, it is to proceed to step 504;

in step 503, it is to update each parameter in the original entry according to a corresponding parameter in the adding/requesting message;

in step 504, it is to add an entry of the AP MAC in the "entire network AP-home forwarding device corresponding table", the entry comprises fields: an AP MAC, a forwarding device network identification, and/or the latest adding time.

Figure 9:
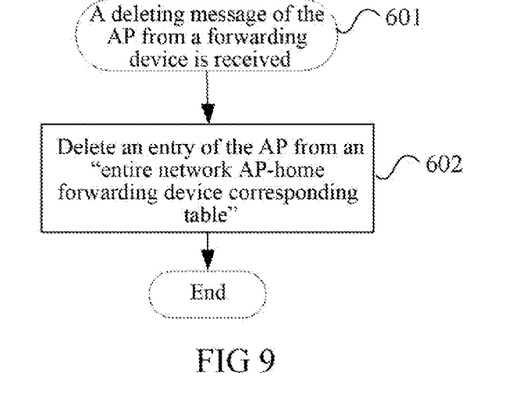
FIG. 9 is a flow chart of the network controller deleting an entry of the "entire network AP-home forwarding device corresponding table" in accordance with the embodiment 6 of the present document.

FIG. 9 is a flow chart of the network controller deleting an entry of the "entire network AP-home forwarding device corresponding table" in accordance with the embodiment 6 of the present document, and as shown in FIG. 9, the following steps are included:

in step 601, a controller has received a deleting message sent by a forwarding device;

the deleting message includes: an aging/deleting identification, AP MAC, a forwarding device network identification.

In step 602, the controller deletes an entry corresponding to the AP MAC from the "entire network AP-home forwarding device corresponding table", the flow ends.

Figure 10:
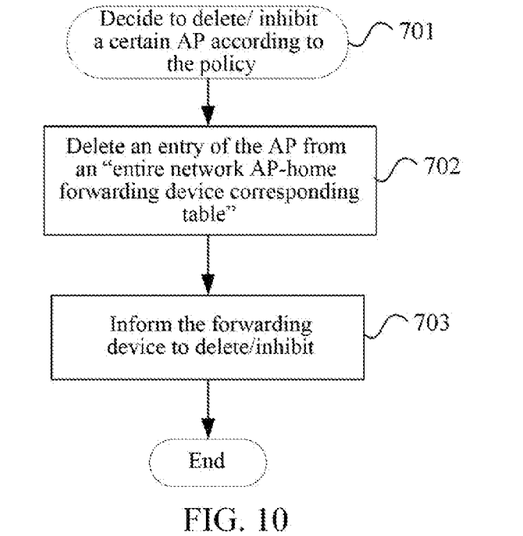
FIG. 10 is a flow chart of the network controller deleting an entry of the "entire network AP-home forwarding device corresponding table" in accordance with the embodiment 7 of the present document.

FIG. 10 is a flow chart of the network controller deleting an entry of the "entire network AP-home forwarding device corresponding table" in accordance with the embodiment 7 of the present document, and as shown in FIG. 10, the following steps are included:

in step 701, the network controller decides to delete/inhibit a certain AP by itself according to a policy;

in step 702, the network controller deletes an entry corresponding to the AP MAC from the "entire network AP-home forwarding device corresponding table";

in step 703, the network controller sends a deleting/inhibit message to inform a forwarding device related to the AP to delete/inhibit the AP, the message includes a deleting/inhibit identification, an AP MAC, and/or an inhibit time.

Aging and deleting management for an entry of a corresponding stream can be implemented by a plurality of other ways. For example, the forwarding device sets a timer for each AP MAC, if one AP MAC has not transmitted and received data for a long time (a length of the time can be strategically configured by the operator according to the situation of the actual usage), and the data forwarding device deletes the AP from a "local AP-home forwarding device corresponding table", and sends a deleting request to the network controller; or it also can base on the embodiment 4, the controller maintains the active time of the AP and performs aging deletion on the entry of the AP, and informs the data forwarding device to delete the entry of the AP.

Figure 11:
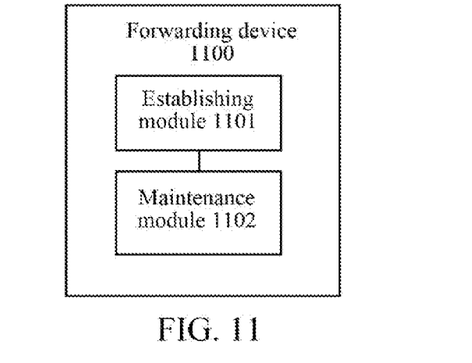
FIG. 11 is a schematic diagram of a forwarding device in accordance with an embodiment of the present document.

FIG. 11 is a schematic diagram of a forwarding device in accordance with the embodiment of the present document, and as shown in FIG. 11, the forwarding device 1100 of the embodiment includes an establishing module 1101 and a maintenance module 1102, and the establishing module 1101 and the maintenance module 1102 are performed by at least one processor, wherein:

the establishing module 1101 is configured to: establish an AP table for local access; and the maintenance module 1102 is configured to: maintain the AP table for local access according to whether a wireless access point in the wireless access point table for local access exists and a state of the wireless access point in the wireless access point table for local access.

In an alternative embodiment, the maintenance module is configured to, after the data has received, if it is determined that a MAC address of an AP sending the data is in a pre-stored manufacturer AP MAC address field table, and not in a non-access list, update the AP table for local access, and send an updating request to the network controller.

In an alternative embodiment, the maintenance module is configured to update the AP table for local access by the following way: judging whether an MAC address of an AP sending the data has exised in the AP table for local access, if the MAC address of the AP sending the data has not existed in the AP table for local access, adding an entry corresponding to the AP sending the data into the AP table for local access; if MAC address of the AP sending the data has existed in AP table for local access, updating time information corresponding to the AP sending the data in the AP table for local access.

In an alternative embodiment, the maintenance module is configured to detect, one by one, whether the AP in the AP table for local access has transmitted or received data in a specified time period; and delete an entry corresponding to the AP which has not transmitted or received data in the specified time period from the AP table for local access, and send a deleting request to the network controller.

In an alternative embodiment, the maintenance module is configured to detect, one by one, whether the AP in the AP table for local access has transmitted or received data in a preset time period corresponding to the AP; and delete an entry corresponding to the AP which has not transmitted or received data in the preset time period corresponding to the AP from the AP table for local access, and send a deleting request to the network controller.

In an alternative embodiment, the maintenance module is configured to, after receiving a deleting message, delete an entry corresponding to the AP specified by the deleting message from the AP table for local access, or move the entry corresponding to the AP specified by the deleting message into a non-access list from the AP table for local access, and adding an inhibit time of the AP specified by the deleting message into the non-access list.

Figure 12:
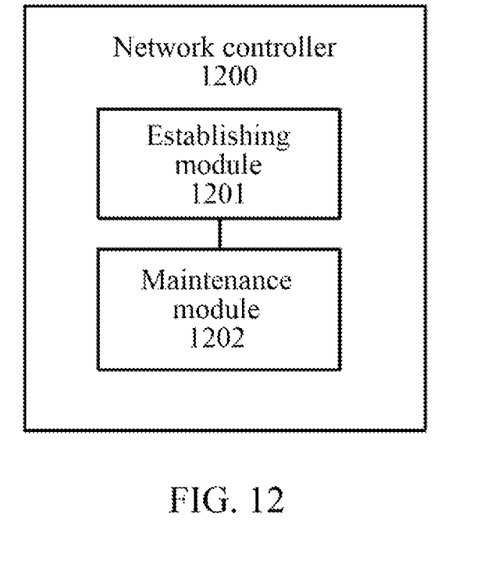
FIG. 12 is a schematic diagram of a network controller in accordance with an embodiment of the present document.

FIG. 12 is a schematic diagram of a network controller in accordance with the embodiment of the present document, and as shown in FIG. 12, the network controller 1200 of the present embodiment includes an establishing module 1201 and a maintenance module 1202, and the establishing module 1201 and the maintenance module 1202 are performed by at least one processor, wherein:

the establishing controller 1201 is configured to establish a corresponding relationship table between entire network APs and home forwarding devices;

the maintenance module 1202 is configured to maintain the corresponding relationship table between entire network APs and home forwarding devices according to a received processing request or a policy instruction.

In an alternative embodiment, the maintenance module is configured to, after receiving an updating request message, check whether an entry corresponding to the AP specified by the updating request message has existed in the corresponding relationship table between entire network APs and home forwarding devices, if the entry corresponding to the AP specified by the updating request message has existed in the corresponding relationship table between entire network APs and home forwarding devices, update parameters in the corresponding entry according to parameters carried in the updating request message; if the entry corresponding to the AP specified by the updating request message has not existed in the corresponding relationship table between entire network APs and home forwarding devices, add the entry corresponding to the AP specified by the updating request message into the corresponding relationship table between entire network APs and home forwarding devices.

In an alternative embodiment, the maintenance module is configured to, after successfully receiving a deleting message, delete a corresponding entry of the AP specified by the deleting message from the corresponding relationship table between entire network APs and home forwarding devices.

In an alternative embodiment, the maintenance module is configured to delete an entry corresponding to a specified AP from the corresponding relationship table between entire network APs and home forwarding devices, and send a deleting message to a forwarding device related to the specified AP.

Those ordinarily skilled in the art can understand that all or some of steps of the above-mentioned method may be completed by the programs instructing the relevant hardware, and said programs may be stored in a computer-readable storage medium, such as read only memory, magnetic or optical disk. Optionally, all or some of the steps in the above-mentioned embodiments may also be implemented by using one or more integrated circuits. Accordingly, each module/unit in the above-mentioned embodiment may be realized in the form of hardware or software function modules. The present document is not limited to any specific form of hardware and software combinations.

The above description is only the alternative embodiments of the present document. Certainly, the present document can still have other various examples. The person skilled in the art can make various corresponding changes and transformations according to the present document without departing from the spirit and essence of the present document, and these corresponding changes and transformations shall all fall into the protection scope of the appended claims of the present document.

INDUSTRIAL APPLICABILITY

The method for processing wireless access, the forwarding device and the network controller provided by the embodiments of the present document have achieved that the data of a corresponding relationship between APs and home devices are kept consistently under a pure WLAN network scenario or a multi-network integrated scenario in which the WLAN network accesses a mobile core network.

What is claimed is:

1. A method for processing wireless access, comprising:
a forwarding device establishing a wireless access point table for local access; and
the forwarding device maintaining the wireless access point table for local access according to whether a wireless access point in the wireless access point table for local access exists and a state of the wireless access point in the wireless access point table for local access;
wherein the step of the forwarding device maintaining the wireless access point table for local access according to whether a wireless access point in the wireless access point table for local access exists and a state of the wireless access point in the wireless access point table for local access comprises:
after the forwarding device has received data, if it is determined that a media access control address of a wireless access point sending the data is in a pre-stored manufacturer wireless access point media access control address field table, and not in a non-access list, the forwarding device updating the wireless access point table for local access, and sending an updating request to a network controller.

2. The method for processing wireless access of claim 1, wherein, the step of updating the wireless access point table for local access comprises:
the forwarding device judging whether the media access control address of the wireless access point sending the data has existed in the wireless access point table for local access, if the media access control address of the wireless access point sending the data has not existed in the wireless access point table for local access, adding an entry corresponding to the wireless access point sending the data into the wireless access point table for local access; if the media access control address of the wireless access point sending the data has existed in the wireless access point table for local access, updating time information corresponding to the wireless access point sending the data in the wireless access point table for local access.

3. The method for processing wireless access of claim 1, wherein, the step of the forwarding device maintaining the wireless access point table for local access according to whether a wireless access point in the wireless access point table for local access exists and a state of the wireless access point in the wireless access point table for local access comprises:
the forwarding device detecting, one by one, whether a wireless access point in the wireless access point table for local access has transmitted or received data in a specified time period; and
the forwarding device deleting an entry corresponding to the wireless access point which has not transmitted or received data in the specified time period from the wireless access point table for local access, and sending a deleting request to the network controller.

4. The method for processing wireless access of claim 1, wherein, the step of the forwarding device maintaining the wireless access point table for local access according to whether a wireless access point in the wireless access point table for local access exists and a state of the wireless access point in the wireless access point table for local access comprises:
the forwarding device detecting, one by one, whether a wireless access point in the wireless access point table for local access has transmitted or received data in a preset time period corresponding to the wireless access point; and
the forwarding device deleting an entry corresponding to a wireless access point which has not transmitted or received data in the preset time period corresponding to the wireless access point from the wireless access point table for local access, and sending a deleting request to the network controller.

5. The method for processing wireless access of claim 1, wherein, the step of the forwarding device maintaining the wireless access point table for local access according to whether a wireless access point in the wireless access point table for local access exists and a state of the wireless access point in the wireless access point table for local access comprises:
after receiving a deleting message, the forwarding device deleting an entry corresponding to a wireless access point specified by the deleting message from the wireless access point table for local access, or moving the entry corresponding to the wireless access point specified by the deleting message into a non-access list from the wireless access point table for local access, and adding an inhibit time of the wireless access point specified by the deleting message into the non-access list.

6. A forwarding device comprising an establishing module and a maintenance module, wherein the establishing module and the maintenance module are performed by at least one processor:
wherein the establishing module is configured to: establish a wireless access point table for local access; and
the maintenance module is configured to: maintain the wireless access point table for local access according to whether a wireless access point in the wireless access point table for local access exists and a state of the wireless access point in the wireless access point table for local access;
wherein, the maintenance module is configured to maintain the wireless access point table for local access according to whether a wireless access point in the wireless access point table for local access exists and a state of the wireless access point in the wireless access point table for local access by the following way:
after the maintenance module has received data, if it is determined that a media access control address of a wireless access point sending the data is in a pre-stored manufacturer wireless access point media access control address field table, and not in a non-access list, the maintenance module updating the wireless access point table for local access, and sending an updating request to a network controller.

7. The forwarding device of claim 6, wherein the maintenance module is configured to update the wireless access point table for local access by the following way:
the maintenance module judging whether the media access control address of the wireless access point sending the data has existed in the wireless access point table for local access, if the media access control address of the wireless access point sending the data has not existed in the wireless access point table for local access, adding an entry corresponding to the wireless access point sending the data into the wireless access point table for local access; if the media access control address of the wireless access point sending the data has existed in the wireless access point table for local access, updating time information corresponding to the wireless access point sending the data in the wireless access point table for local access.

8. The forwarding device of claim 6 wherein the maintenance module is configured to maintain the wireless access point table for local access according to whether a wireless access point in the wireless access point table for local access exists and a state of the wireless access point in the wireless access point table for local access by the following way:
   the maintenance module detecting, one by one, whether a wireless access point in the wireless access point table for local access has transmitted or received data in a specified time period; and
   the maintenance module deleting an entry corresponding to the wireless access point which has not transmitted or received data in the specified time period from the wireless access point table for local access, and sending a deleting request to the network controller.

9. The forwarding device of claim 6 wherein the maintenance module is configured to maintain the wireless access point table for local access according to whether a wireless access point in the wireless access point table for local access exists and a state of the wireless access point in the wireless access point table for local access by the following way:
   the maintenance module detecting, one by one, whether a wireless access point in the wireless access point table for local access has transmitted or received data in a preset time period corresponding to the wireless access point; and
   the maintenance module deleting an entry corresponding to a wireless access point which has not transmitted or received data in the pre-set time period corresponding to the wireless access point from the wireless access point table for local access, and sending a deleting request to the network controller.

10. The forwarding device of claim 6 wherein the maintenance module is configured to maintain the wireless access point table for local access according to whether a wireless access point in the wireless access point table for local access exists and a state of the wireless access point in the wireless access point table for local access by the following way:
   after receiving a deleting message, the maintenance module deleting an entry corresponding to a wireless access point specified by the deleting message from the wireless access point table for local access, or moving the entry corresponding to the wireless access point specified by the deleting message into a non-access list from the wireless access point table for local access, and adding an inhibit time of the wireless access point specified by the deleting message into the non-access list.

11. A method for processing wireless access, comprising:
   a network controller establishing a corresponding relationship table between entire network wireless access points and home forwarding devices; and
   the network controller maintaining the corresponding relationship table between entire network wireless access points and home forwarding devices according to a received processing request or a policy instruction;
   wherein, the step of the network controller maintaining the corresponding relationship table between entire network wireless access points and home forwarding devices according to a received processing request comprises:
   after receiving an updating request message, the network controller checking whether a corresponding entry of a wireless access point specified by the updating request message has existed in the corresponding relationship table between entire network wireless access points and home forwarding devices, if the corresponding entry of the wireless access point specified by the updating request message has existed in the corresponding relationship table between entire network wireless access points and home forwarding devices, updating parameters in the corresponding entry according to parameters carried in the updating request message; if the corresponding entry of the wireless access point specified by the updating request message has not existed in the corresponding relationship table between entire network wireless access points and home forwarding devices, adding a corresponding entry of the wireless access point specified by the updating request message into the corresponding relationship table between entire network wireless access points and home forwarding devices.

12. The method for processing wireless access of claim 11, wherein, the step of the network controller maintaining the corresponding relationship table between entire network wireless access points and home forwarding devices according to a received processing request comprises:
   after receiving a deleting message, the network controller deleting a corresponding entry of a wireless point specified by the deleting message from the corresponding relationship table between entire network wireless access points and home forwarding devices.

13. The method for processing wireless access of claim 11, wherein, the step of the network controller maintaining the corresponding relationship table between entire network wireless access points and home forwarding devices according to a policy instruction comprises:
   the network controller deleting a corresponding entry of a specified wireless access point from the corresponding relationship table between entire network wireless access points and home forwarding devices, and sending a deleting message to a forwarding device related to the specified wireless access point.

14. A network controller, comprising an establishing module and a maintenance module, wherein the establishing module and the maintenance module are performed by at least one processor:
   wherein the establishing module is configured to: establish a corresponding relationship table between entire network wireless access points and home forwarding devices; and
   the maintenance module is configured to: maintain the corresponding relationship table between entire network wireless access points and home forwarding devices according to a received processing request or a policy instruction;
   wherein, the maintenance module is configured to maintain the corresponding relationship table between entire network wireless access points and home forwarding devices according to a received processing request or a policy instruction by the following way:
   after receiving an updating request message, the maintenance module checking whether a corresponding entry of a wireless access point specified by the updating request message has existed in the corresponding relationship table between entire network wireless access points and home forwarding devices, if the corresponding entry of a wireless access point specified by the updating request message has existed in the corresponding relationship table between entire network wireless access points and home forwarding devices, updating parameters in the corresponding entry according to parameters carried in the updating request message; if the corresponding entry of a wireless access point specified by the updating request message has not existed in the corresponding relationship table between entire network wireless access points and home forwarding devices, adding a corresponding entry of the wireless access point specified by the updating request message into the corresponding relationship table between entire network wireless access points and home forwarding devices.

15. The network controller of claim 14, wherein, the maintenance module is configured to maintain the corresponding relationship table between entire network wireless access points and home forwarding devices according to a received processing request or a policy instruction by the following way:

after receiving a deleting message, the maintenance module deleting a corresponding entry of a wireless point specified by the deleting message from the corresponding relationship table between entire network wireless access points and home forwarding devices.

16. The network controller of claim 14, wherein, the maintenance module is configured to maintain the corresponding relationship table between entire network wireless access points and home forwarding devices according to a received processing request or a policy instruction by the following way:

the maintenance module deleting a corresponding entry of a specified wireless access point from the corresponding relationship table between entire network wireless access points and home forwarding devices, and sending a deleting message to a forwarding device related to the specified wireless access point.

* * * * *